April 20, 1937. A. L. RAVEN Re. 20,336

MOTION PICTURE SCREEN

Original Filed Aug. 9, 1930 2 Sheets-Sheet 1

INVENTOR
Albert L. Raven

BY
Pennie, Davis, Marvin & Edmonds
HIS ATTORNEYS

April 20, 1937. A. L. RAVEN Re. 20,336

MOTION PICTURE SCREEN

Original Filed Aug. 9, 1930 2 Sheets-Sheet 2

INVENTOR
Albert L. Raven
BY
Pennie, Davis, Marvin & Edmonds
HIS ATTORNEYS

Reissued Apr. 20, 1937

Re. 20,336

UNITED STATES PATENT OFFICE 20,336

MOTION PICTURE SCREEN

Albert L. Raven, Mount Vernon, N. Y.

Original No. 1,880,279, dated October 4, 1932, Serial No. 474,124, August 9, 1930. Application for reissue October 3, 1934, Serial No. 747,034

15 Claims. (Cl. 88—24)

The present invention relates to screens for the projection of pictures accompanied by sound.

In order to properly show pictures accompanied by sound, and particularly talking motion pictures, it has been found necessary to have the sound transmitted through the picture screen itself rather than by placing the loud speakers around the sides of the screen. By placing the loud speakers directly behind the screen and providing a properly constructed screen, the sound, for example the voices of the actors in a talking motion picture, appear to proceed more nearly from the mouth of the person speaking. This is of particular importance with the advent of pictures which are shown on extremely large sized screens.

The proper construction of such a screen presents a number of problems. Both the proper reflection of the picture projected upon the screen must be provided for, and the screen should be so made that the sound will readily pass through it without being muffled or modified so as to change undesirably the character of the sound, whether speech or music. The screen must function efficiently in both of these ways so that the transmission of the sound will not affect the reflection of the picture, and vice versa.

It is important furthermore, that the screen be fireproof and that it be capable of manufacture simply and economically, also that it present a smooth, unwrinkled surface and be easy to support in its position in the theatre. It should also be so constructed that it will collect as little dust as possible and be susceptible of being easily cleaned from time to time.

Another feature of importance in connection with these screens is that they be capable of being readily installed in the theatre and so made that they can be shipped to the place of installation without difficulty.

The object of my present invention is to provide a screen which will possess these features, and the invention will be understod from the following description taken in connection with the accompanying drawings showing several embodiments of the invention. Features in addition to those mentioned above will appear during the course of this description, and it will be understood that the several forms of the invention described and illustrated are included by way of example for the purpose of disclosing the invention, and that the construction of the screen may be modified, within the scope of the appended claims without going beyond the invention.

Figs. 5 to 8 inclusive are views corresponding respectively to Figs. 1 to 4 inclusive, but illustrating a modified form of screen.

Figure 10:
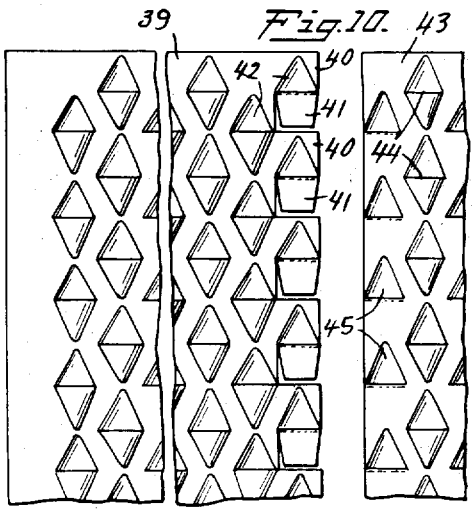
Figure 9:
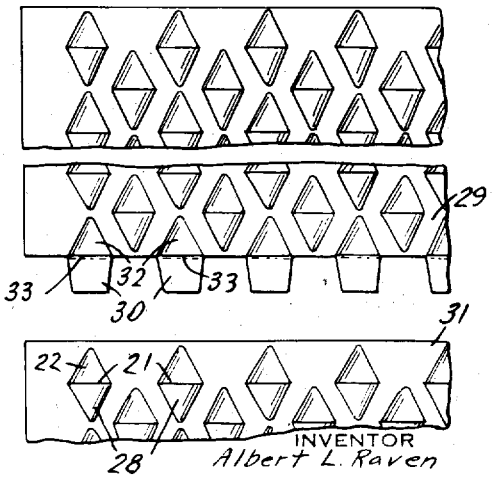
Figure 11:
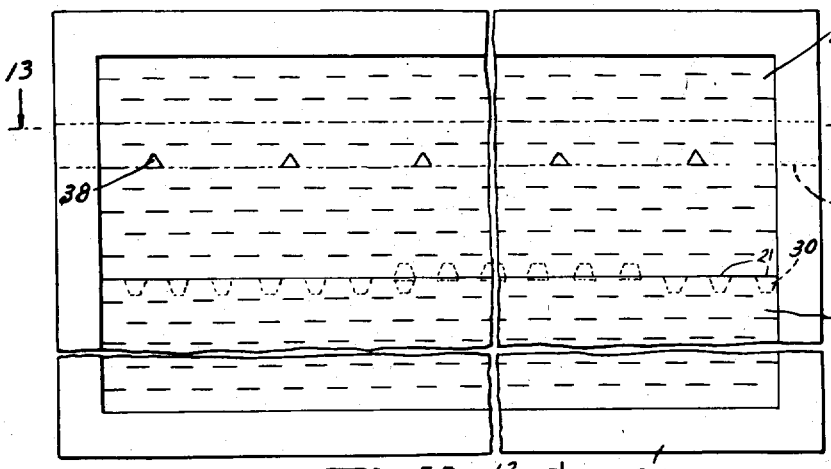
Figure 12:
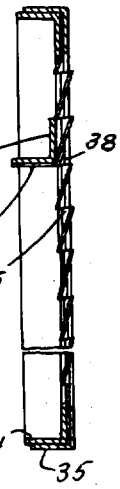
Figure 13:
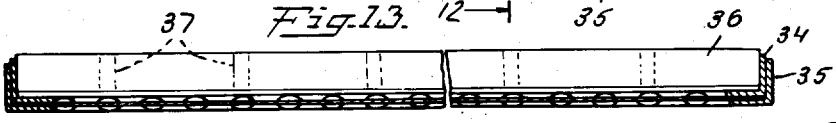
Figure 14:
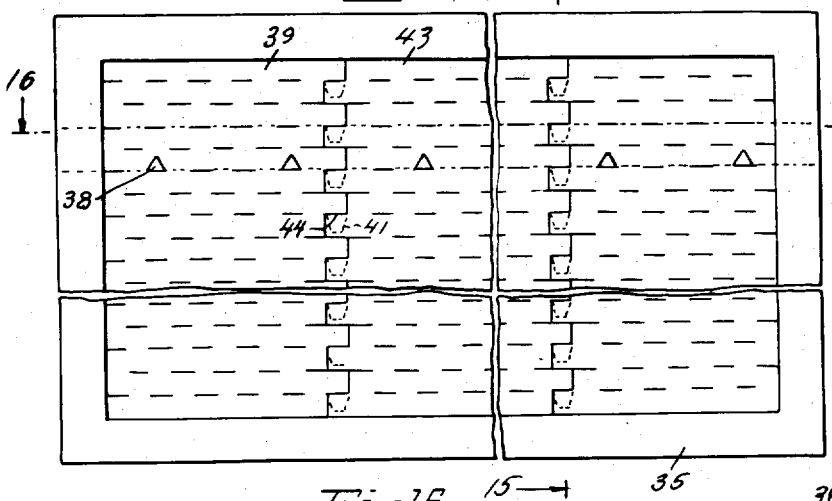

Fig. 9 is a front elevation illustrating the manner in which two horizontal strips of screens are secured together;

Fig. 10 is a front elevation illustrating the manner in which two vertical strips of screen are secured together;

Fig. 11 is a front elevation of an entire screen composed of a plurality of horizontal strips;

Fig. 12 is a vertical section taken on line 12—12 of Fig. 11;

Fig. 13 is a horizontal section taken on line 13—13 of Fig. 11;

Fig. 14 is a view similar to Fig. 11 showing a screen made up of a plurality of vertical strips.

Figure 15:
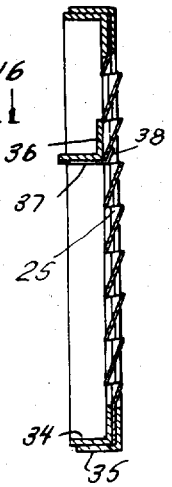
Figure 16:
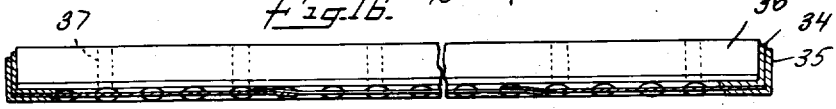

Fig. 15 is a vertical section taken on line 15—15 of Fig. 14;

Fig. 16 is a horizontal section taken on line 16—16 of Fig. 14 and

Figure 17:
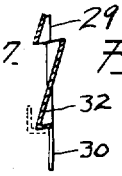
Figure 18:
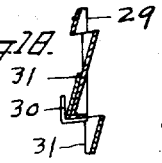

Figs. 17 and 18 are fragmentary vertical sections through a joint between two panels or sections of the screen illustrating the manner of locking the panels together in such a way as to avoid the necessity for employing a framework such as shown in Figs. 11 to 16 inclusive.

Figure 1:
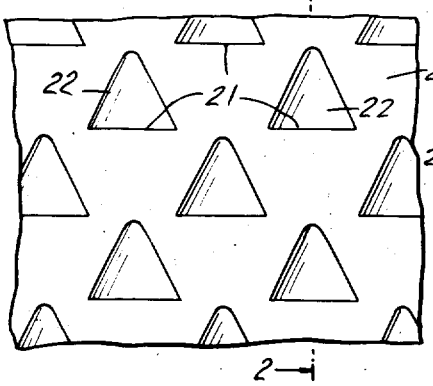
Fig. 1 is a front elevation of a small portion of a partially completed screen.
Figure 2:
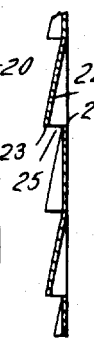
Fig. 2 is a vertical section taken on line 2—2 of Fig. 1.
Figure 5:
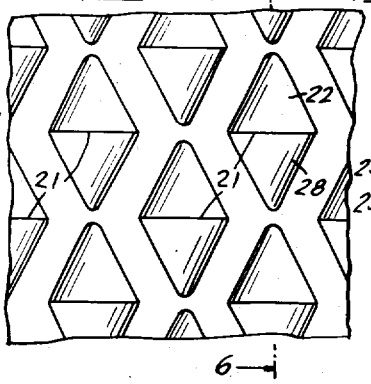
Figure 6:
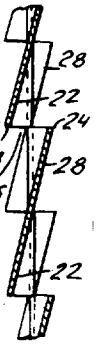

Referring first to Figs. 1 to 4 inclusive of the accompanying drawings, the improved screen of my present invention is made from sheet material 20 having spaced horizontal slits 21 therein. These slits or incisions are formed by cutting, punching, of by any other convenient means. The slits are relatively short and are preferably uniformly spaced, although a non-uniform spacing may be used if desired in order to vary the texture which the screen appears to have. In Figs. 1 to 10 of the drawings the size of the slits has been enlarged somewhat for clearness of illustration. The slits are preferably, though not necessarily, arranged in horizontal rows, and the slits of adjacent rows staggered with respect to one another as shown in Fig. 1.

After the formation of the slits 21, the material adjacent each slit is forced out of the plane of the sheet forming depressions 22 and offsetting the downwardly facing edge 23 of each slit with respect to the upwardly facing edge 24 of each slit. The depressions 22 may be of triangular shape as illustrated, although their form may be varied considerably and is determined by the shape of the die or other tool which is employed to form them.

The offsetting of the edges 23 and 24 forms an oblique passageway 25 for the transmission of sound through the screen, and the distribution of these apertures throughout the surface of the screen provides adequately for the transmission of sound without distortion or other undesirable modification thereof. Such a screen, when the front surface thereof is suitably treated to give it appropriate light-reflecting properties, is extremely satisfactory for the showing of sound pictures where the entire audience is at an elevation not much above the lower edge of the screen. Such a screen therefore can be used in a great many theatres where there are no balconies and where the slope of the main floor is not sufficient to bring the level of the eye of a person seated in the rear of the theatre much above the lower border of the screen.

However, if the eye of an observer is at an elevation much above the lower border of the screen, he will be able to look through some of the openings 25 and consequently these small areas of the picture will be lost to him, and the picture will have a tendency to appear blurred even though the projector is accurately focused. In order to overcome this difficulty, small projections 26 are provided on the downwardly facing edges 23 of slits 21. Preferably, also, projections 27 are provided on the upwardly facing edges 24.

Figure 3:
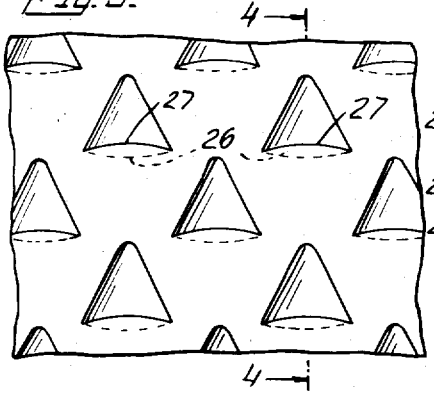
Fig. 3 is a front elevation of a portion of completed screen corresponding to the portion illustrated in Fig. 1.
Figure 4:
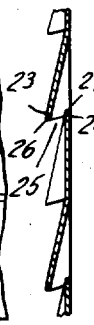
Fig. 4 is a vertical section taken on line 4—4 of Fig. 3.
Figure 7:
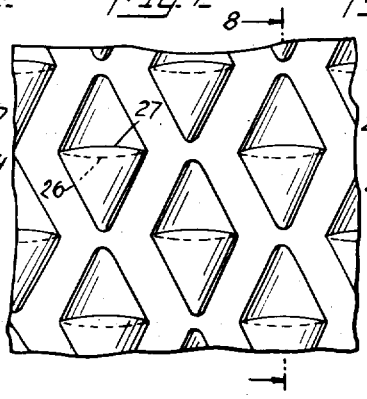
Figure 8:
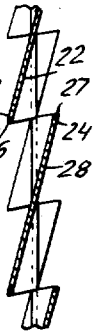

In this way the downwardly and upwardly facing edges of the slits are made to overlap one another, and the oblique passageways 25 are slightly lengthened. This is illustrated in Figs. 3 and 4. This overlap is sufficient to enable persons sitting in the balcony of a great majority of theatres to view the picture on the screen without being able to see through the oblique passageways 25. Moreover, the lengthening of the passageways 25 is not sufficient to materially retard the passage of sound nor to cause distortion.

The projections 26 and 27 are conveniently and easily provided by applying a coating material, such for example as paint, lacquer, varnish, or the like to the screen. The application of such material may be made either by hand brush or air brush. This coating may be applied to either the front or the rear or both surfaces of the screen. It is preferable that the screen be so hung during the coating operation that the coating material may run downwardly and collect in drops on the downwardly facing edge of the screen. Thus, for example, coating should be applied to the rear surface of the screen while the screen is hanging in normal position, and in order to apply the coating to the front surface of the screen it should be turned upside down.

The viscosity of the liquid coating material will then cause it to form in drops and solidify in a curved shape somewhat as illustrated at 26 and 27 in the drawings. The coating material used may be that employed for imparting desired reflecting characteristics to the screen, and as motion picture screens are painted from time to time in order to renew their reflecting qualities, this periodical painting assists in maintaining and building up the extent of the overlap of the edges of the slits. The width of apertures 25 is sufficient to prevent films of the coating material from forming across them and closing them.

The modified form of screen illustrated in Figs. 5 to 8 inclusive is similar to the screen above described except that the metal below the slits 21 is forced out of the plane of the screen as well as the metal above the slits. The metal below the slits is forced forwardly forming the protuberances 28 while the depressions 22 are present as before. In this way the downwardly facing edge 23 of each slit is separated by about twice the distance from the upwardly facing edge 24, and consequently the sound passages 25 are enlarged in size. If desired, the projections 26 and 27 may be provided in the same manner as previously described.

The material of which the screen is composed is preferably sheet material, such for example as sheet aluminum, zinc, copper or steel. The screen may, however, also be made of molded composition, or of fibrous sheet material such for example as vulcanized fibre. Such material, however, should be fireproof or fire resisting.

The manufacture of the screen can be carried on more easily by operating upon sheet material of comparatively narrow widths than by making up a sheet of the full dimensions of the screen. The screen may be made up either of horizontal strips or of vertical strips, as many of these strips being employed as is necessary to produce the size of screen desired. In Fig. 9 the manner of joining together two horizontal strips is illustrated. The lower edge of the horizontal strip 29 is provided with regularly spaced tongues 30. These tongues are adapted to fit into the uppermost row of slits 21 in the adjacent lower strip 31. Tongues 30 are of substantially the same width as the length of slits 21 so that a snug fit is produced, preventing the lateral movement of the strips. Tongues 30 are placed opposite the lowermost row of depressions which correspond to depressions 22 in the previous figures, but the slits along the lower boundaries of depressions 32 are omitted, and form a sharp corner 33 which gives the appearance of a slit, but which at the same time serves to attach the tongues 30 rigidly to the sheet 29.

When strips 29 and 31 are assembled with tongues 30 inserted within the slits 21, the depressions 32 occur above the protuberances 28 of the uppermost row of slits 21, so that the uniform appearance of each strip is preserved at the joint between the two strips. The tongues 30 fill slits 21 of the uppermost row in strip 31 so that actually there are no sound openings on this row, but this is unimportant because of the great number of sound openings occurring throughout the surface of the screen.

In Figs. 11, 12 and 13 is shown a plurality of strips similar to strips 29 and 31 mounted in a frame ready for the projection of a picture thereon. In Fig. 11 the tongues 30 which hold the strips in registry are shown in dotted lines. Some of these tongues are shown bent upwardly as illustrated in greater detail in Figs. 17 and 18, the purpose of which will be referred to again. A rigid frame 34 of steel angles surrounds the periphery of the screen and supports the same at all four edges. The margins of the screen are clamped against this frame by means of a rectangular guard 35 also of steel angles which is adapted to fit over frame 34. This guard may be bolted, clamped, or otherwise appropriately secured in position. With the rigid frame 34 to support the edges of the screen, tongues 30 may be bent upwardly or left projecting straight downwardly as desired, since the frame holds the tongues in place in the slits of the adjacent panel.

In large screens made of sheet metal of small gauge, where there may be some tendency for the surface of the screen to be rippled by air currents, or where there is a tendency for the screen to be set in vibration by the sound, the screen is rigidly supported at regular intervals throughout its surface. A number of these supports are shown in Figs. 11, 12 and 13. A rigid horizontal bar 36 is secured at its ends to the upright sides of frame 34, and secured to the bottom of this bar at spaced intervals throughout its length are a plurality of anchors 37 of thin metal having turned up ends 38 which are adapted to be received within certain of the sound passages 25. In this way the outer or front face of the screen is pressed firmly against the bar 36, and the screen is thus effectively and firmly held in position against vibration.

In Fig. 10 there is illustrated the arrangement of a joint between vertical strips. As shown, the right hand vertical edge of strip 39 has a number of L-shaped cuts in it forming horizontal projections 40 which are uniformly spaced. From each of these projections 40 a vertical tongue 41 projects downwardly. In projections 40 and just above tongue 41 is a depression 42 which is similar to depressions 32 shown in Fig. 9 in that it is like all of the other depressions in the strip except for the fact that there is no slit along its lower edge 33, but only the appearance of a slit.

In assembly strip 39 with its neighboring strip 43, the tongues 41 are inserted in the slits 44 which constitute the first vertical row of slits in strip 43. These slits are formed in the same manner as the slits 21 of Figs. 1 to 5. Triangular depressions 45 are provided along the margin of panel or strip 43 corresponding to the second vertical row of depressions 42 in strip 39. This allows the two panels, 39 and 43, to fit snugly together.

Figs. 14, 15 and 16 illustrate a complete screen made of a plurality of vertical strips similar to strips 39 and 43, the interconnecting interlocking tongues 41 being shown in dotted lines. The frame of this screen is constructed in exactly the same manner, and the screen is prevented from vibrating in the same way as has been described in connection with Figs. 11, 12 and 13.

Now referring to Figs. 17 and 18, by bending tongues 30 rearwardly and upwardly as shown in dotted lines in Fig. 17, and in full lines in Fig. 18, the two adjacent panels, say for example panels 29 and 31, are securely fastened together and it is unnecessary to provide any additional means such as the frame 34 to hold the tongues within the slits. Any number of panels may be secured together in this manner to form a screen of any desired size. The tongues 41 of the vertical panels shown in Fig. 10 may be bent upwardly in the same way. A screen made up of panels in this way is very economical to make and to support. No frame is needed to hold the panels together. This screen may be hung after the manner of any sheet screen merely by means of suitable attachments along its upper edge, and if desired, with the addition of a rigid bar along the upper edge, and preferably also along the lower edge for the purpose of maintaining the screen in flat condition.

It will be understood that the screens shown in Figs. 9 to 18 inclusive are constructed as described in connection with Figs. 1 to 8 inclusive so as to cause the downwardly and upwardly facing edges of the slits to overlap one another and form oblique sound passages extending upwardly from the rear toward the front of the screen. Figs. 11 to 16 inclusive are somewhat diagrammatic in character as to the representation of the screen.

The light reflecting coating upon the screen above described may have any properties desired. When the screen is to be used in narrow theatres where most of the light is to be reflected within a small angle from the line of projection, the screen may be coated with specular material, but where the screen is to be used in a wide theatre so that the picture must be as bright as possible at wide angles horizontally from the axis of projection, a coating which presents a fine grained surface which will diffuse the light should be used.

The result which it is desired to obtain in my improved screen is the effect of a screen which is from the projection standpoint a continuous unbroken flat surface similar to the screen used for non-sound pictures, avoiding the dusty appearance produced by punching visible holes through the screen, and at the same time to provide an extremely large member of sound passages through the screen which will effectively transmit the sound.

The screen of my present invention accomplishes this result to a remarkable degree. I attribute this result to the fact that the oblique passageways are invisible to the audience and prevent shadows from being cast by the projection apparatus in such a way as to be visible to the audience, and also to the fact that the depressions and protuberances in the surface of the screen produce a uniform texture throughout the surface of the screen. A person viewing a picture projected upon the screen is unconscious of the formations in the surface of the screen, and it appears to have a uniform surface.

My improved screen has a number of advantages including ease of manufacture, ease of shipment, and convenience of installation in addition to its advantages from the projection and sound transmitting standpoint. For example the completely formed panels or strips may be shipped flat and assembled into a screen at their destination, or assembled at the factory and rolled into packages of comparatively small diameter which may be shipped without difficulty.

I claim:

1. A screen for the projection of pictures accompanied by sound comprising sheet material in sheet form having horizontal incisions therein, each incision forming a downwardly and an upwardly facing edge offset from one another, and a projection on one of said edges to cause them to overlap forming an oblique sound passage, the said sound passages passing in a common direction from the rear to the front face of the screen.

2. A screen for the projection of pictures accompanied by sound comprising sheet material in sheet form having a multitude of small horizontal incisions therein, said incisions being arranged substantially in horizontal rows, and the incisions of adjacent rows being placed in staggered relationship, each incision having a downwardly and an upwardly facing edge offset from one another, and a projection on one of said edges to cause them to overlap and form an oblique sound passage passing upwardly from the rear to the front face of the screen.

3. A screen for the projection of pictures accompanied by sound comprising sheet material in sheet form having depressions in the front face thereof distributed in spaced relation throughout the area of the screen, incisions along the lower boundaries of said depressions each incision forming a pair of offset downwardly and upwardly facing edges, and a projection on one of said edges to cause them to overlap and form an oblique sound passage passing upwardly from the rear to the front face of the screen.

4. A screen for the projection of pictures accompanied by sound comprising sheet material in sheet form having pairs of depressions and protuberances in the front face thereof distributed in spaced relation throughout the area of the screen, an incision between each of said depressions and protuberances forming a downwardly facing edge at the bottom of said depressions and an upwardly facing edge at the top of said protuberance, and a projection on one of said edges to cause them to overlap and form an oblique sound passage passing upwardly from the rear to the front face of the screen.

5. A screen for the projection of pictures accompanied by sound comprising strips of sheet material having horizontal slits therein, each slit forming a downwardly and an upwardly facing edge offset from one another providing an oblique sound passage passing from the rear to the front face of the screen, and tongues equally spaced along one edge of said strips adapted to be received in a row of said slits near the edge of an adjacent strip so as to secure said strips together.

6. A screen for the projection of pictures accompanied by sound comprising a sheet of material having apertures therethrough distributed over the area of the sheet for the transmission of sound therethrough, a frame for supporting said sheet comprising members rigidly mounted in a single plane located at least two opposite sides of said screen, means for securing said sides to said members, and means for holding the central portion of said screen against vibration comprising anchors having laterally projecting tongues inserted within certain of said apertures and coacting with the front face of the screen, and means for fixedly mounting said anchors.

7. A screen for the projection of pictures accompanied by sound comprising a plurality of panels of sheet material, each panel having sound apertures therethrough, and said panels being secured together by a plurality of spaced tongues adjacent the edge of one strip adapted to engage similarly spaced slits adjacent the edge of the neighboring strip, said tongues being interlocked in said slits in such manner as to maintain the edges of said panels in close relation so as to give the assembled panels the appearance of a single sheet.

8. A screen for the projection of pictures accompanied by sound comprising a plurality of horizontal panels of sheet material having sound passages therethrough, said panels being secured together along their edges by tongues spaced along the edge of one panel, and slits similarly spaced along the edge of an adjacent panel, said tongues being reversely bent after insertion in said slits, so as to cause an interlocking of the two panels along their edges.

9. A screen for the projection of pictures accompanied by sound comprising a plurality of horizontal panels of sheet material having spaced slits therein, a depression adjacent the upper edge of each slit, said panels being secured together along their horizontal edges by tongues spaced along the edge of one panel received within the first horizontal row of slits in the other panel, and depressions adjacent said tongues fitting into the depressions adjacent said first row of slits so as to allow the surfaces of the panels to fit snugly together.

10. A screen for the projection of pictures accompanied by sound comprising vertical panels of sheet material having sound apertures therethrough, said panels being secured together along their vertical edges by means of vertical tongues extending from spaced horizontal projections on the edge of one panel, said tongues being received within slits arranged near the edge of the adjacent vertical panel.

11. A screen for the projection of pictures accompanied by sound comprising sheet material in sheet form having incisions therein, the surface of the sheet being displaced out of the plane of the sheet adjacent each incision so as to offset the edges of the incision and provide a sound passage through the screen the said sound passages opening in a common direction on the front side of the screen.

12. A screen for the projection of pictures accompanied by sound comprising strips of sheet material having slits therein, the surface of the sheet being displaced adjacent each slit so as to offset the edges of the slit and provide a sound passage through the screen opening upwardly on the front side of the screen, and tongues spaced along one edge of said strips adapted to be received in a row of slits near the edge of the adjacent strip so as to secure said strips together.

13. A screen for the projection of pictures accompanied by sound comprising a plurality of vertical panels of sheet material having spaced slits therein, a depression adjacent the upper edge of each slit thereby offsetting the edges of the slits and forming sound passages through the screen, said panels being secured together along their vertical edges by means of vertical tongues extending from horizontal projections spaced along the edge of one panel, said tongues being received within the first vertical row of slits in the adjacent panel, and depressions in said horizontal projections adjacent said tongues adapted to fit into the depressions adjacent said first row of slits so as to allow the surfaces of the panels to fit snugly together.

14. A screen for the projection of pictures accompanied by sound comprising sheet material in sheet form having a multitude of short incisions therein distributed in spaced relationship throughout the area of the screen, the surface of the sheet being displaced out of the plane of the sheet adjacent each incision so as to offset the edges of the incisions and provide sound passages through the screen opening upwardly on the front side of the screen.

15. A screen for the projection of pictures accompanied by sound comprising sheet material in sheet form having a light-reflecting surface to receive a picture and provided with a multitude of short incisions therein distributed in spaced relation throughout the area of the screen, the surface of the sheet adjacent the incisions being displaced out of the plane of the sheet adjacent each incision so as to offset the edges of the incisions and provide sound passages through the screen, the said passage opening in a common direction on the front side of the screen and causing the screen to present a substantially continuous surface for reflecting a picture projected thereupon.

ALBERT L. RAVEN.